Sept. 11, 1951 C. W. HEATH 2,567,884
SHEET METAL FASTENER FOR SECURING
MEMBERS TO SUPPORTS
Filed Sept. 1, 1949
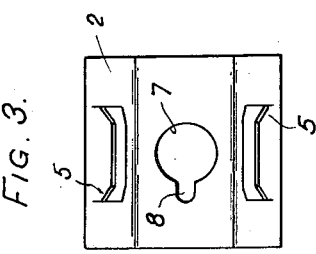
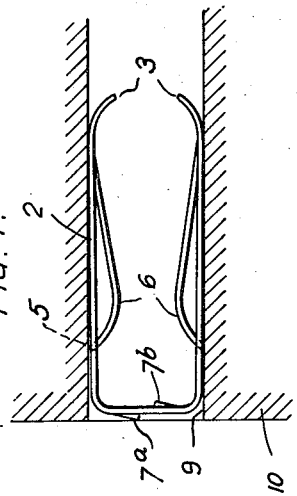
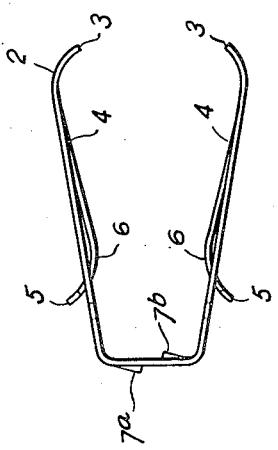
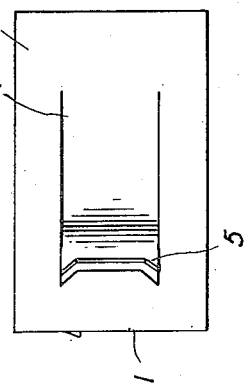
INVENTOR:
CLARENCE WILLANS HEATH,
BY Philip E. Parker
ATTORNEY.

Patented Sept. 11, 1951

2,567,884

UNITED STATES PATENT OFFICE 2,567,884

SHEET METAL FASTENER FOR SECURING MEMBERS TO SUPPORTS

Clarence Willans Heath, Bleasby, England, assignor to United-Carr Fastener Corporation, Cambridge, Mass., a corporation of Massachusetts Application September 1, 1949, Serial No. 113,636 In Great Britain September 27, 1948

2 Claims. (Cl. 85—2.4)

This invention relates to nut or like fasteners adapted to be secured in a recess or aperture in a support.

It is an object of the invention to provide an improved form of fastener adapted to be secured to a support and providing means for attaching a member thereto.

According to the present invention a fastener comprises a base having spaced resilient arms extending therefrom, the arms being adapted to be forced apart to engage the walls of the recess or aperture by a bolt or the like inserted between the arms.

To enable the invention to be fully understood it will now be described with reference to the accompanying drawing, in which—

Fig. 1 is a side elevation of a fastener according to one embodiment of the invention;

Fig. 2 is a plan view;

Fig. 3 an end elevation, and

Fig. 4 is a view with the fastener initially inserted prior to being secured by the insertion of a bolt or the like.

As shown in the accompanying drawing the fastener is formed from sheet metal and comprises a base 1 having resilient arms 2 extending therefrom to form a U-shaped member, the ends of the arms having inwardly curved portions 3. A resilient tongue 4 is formed integrally from each arm 2 and is hingedly connected therewith adjacent to the free end of the arm. The tongues are formed with a sharp edge or projecting teeth at the free ends 5 and the tongues are bent to provide an intermediate portion 6 which projects inwardly of the arms 2 with the free ends 5 projecting outwardly of the said arms adjacent the base 1.

The base 1 is formed with a circular aperture 7 and an offset slot 8, the edges of the aperture being bent upwardly and downwardly as indicated at 7a, 7b, to form a thread-receiving aperture for a screw-threaded shank of a bolt or the like (not shown).

The fastener is adapted to be inserted into a recess 9 of a support indicated by 10, to form a nut or like fastening to enable an article to be secured to the support.

The fastener is assembled in the recess 9 by compressing the arms 2 to slightly less than the width of the recess and sliding it inwardly until the base 1 is substantially flush with the outer surface of the support, the curved ends 3 facilitating the ready insertion into the recess. The fastener will be initially held in position by the spring action of the arms 2. To secure an article to the support, a screw-threaded bolt or the like, which may for example extend through an aperture in the article to be secured, is threaded into the nut means formed by the aperture 7 in the base 1. As the bolt is screwed into position, its shank will engage the curved portions 6, which extend inwardly of the arms 2, and force them outwardly causing the free ends 5 of the tongue to be forced into engagement with the walls of the recess 9 to secure the device to the support.

It will be understood that the tongues are so shaped and bent that when the fastener is assembled in the recess the curved portions 6 are spaced apart a distance less than the diameter of the bolt or the like adapted to be inserted into the fastener.

Accordingly, the screwing of the bolt into the fastener simultaneously secures the fastener in the recess and an article to the support.

Instead of the fastener being adapted to receive a screw-threaded bolt it may be adapted to receive a shank having cam means adapted when rotated to engage and force the tongue 4 outwardly, the shank being provided with projections adapted when rotated to engage the inner surface of the base 1 to provide axial outward movement of the shank.

If desired the tongues 4 may be omitted and the arms 2 may be adapted to be forced outwardly by an inserted bolt or the like, the free ends of the arms having projections, or being roughened to provide a satisfactory grip with the walls of the recess.

The fastener is particularly useful for securing members to supports formed of moulded resinous or like compounds which cannot readily be drilled or tapped with screw threads or have nut or socket portions secured thereto. The invention is also particularly useful in providing a nut member which may be detachably secured to a support where access is only possible to one side. One convenient application of the invention is for securing back panels to the moulded cabinets of wireless or other cabinets.

I claim:

1. A sheet metal fastener adapted to be secured in a recess in a support, said fastener comprising a U-shaped member having a base portion and opposed resilient arm portions extending from opposite sides of said base portion, said base portion having an aperture and thread-engaging portions for receiving a threaded bolt member, the free ends of said arm portions being curved inwardly to facilitate insertion of the member into a recess in a support, each of said arm portions having an elongated aperture extending longitudinally thereof and a resilient tongue formed from the material cut from the arm portion to provide the aperture and extending integrally from the arm portion at the edge of the aperture adjacent the free end of the arm portion, said tongues extending inwardly toward each other to provide intermediate the ends thereof opposed bolt-engaging portions spaced apart a distance less than the diameter of the aperture in the base when the arm portions are disposed in substantially parallel relationship, the free end portions of said tongues being curved outwardly to provide camming surfaces for camming engagement with the end of bolt member and extending through the apertures of said arm portions and having terminal ends adapted to make locking engagement with the walls of the recess in the support in which the fastener is inserted when a threaded bolt member is inserted through the aperture in the base portion and between the arm portions.

2. A sheet metal fastener adapted to be secured in a recess in a support, said fastener comprising a U-shaped member having an apertured base portion and opposed resilient arm portions, said base portion having thread-engaging portions for engaging a threaded bolt member inserted into the aperture of said base portion, each of said arm portions having an elongated aperture extending longitudinally thereof and a resilient tongue formed from the material cut from the arm portion to provide the aperture and extending integrally from the arm portion at the edge of the aperture adjacent the free end of the arm portion, said tongues extending inwardly toward each other to provide intermediate the ends thereof opposed bolt-engaging portions spaced apart a distance less than the diameter of the aperture in the base portion, the free end portions of said tongues being curved outwardly and extending through the apertures of said arm portions and having terminal ends adapted to make locking engagement with the walls of the recess in a support in which the fastener is inserted when a threaded bolt member is inserted through the aperture in the base portion and between arm portions.

CLARENCE WILLANS HEATH.

REFERENCES CITED

The following references are of record in the file of this patent:

UNITED STATES PATENTS

| Number | Name | Date |
| --- | --- | --- |
| 895,769 | Kohnstamm | Aug. 11, 1908 |
| 1,161,155 | Pleister | Nov. 23, 1915 |
| 1,323,728 | Toth | Dec. 2, 1919 |
| 1,664,566 | Marshall | Apr. 3, 1928 |
| 1,944,513 | Johnson | Jan. 23, 1934 |
| 2,208,779 | Tinnerman | July 23, 1940 |
| 2,267,379 | Tinnerman | Dec. 23, 1941 |
| 2,353,851 | Rosan | July 18, 1944 |